(12) United States Patent
Laurent et al.

(10) Patent No.: US 12,540,638 B2
(45) Date of Patent: Feb. 3, 2026

(54) BLIND TYPE REMOVABLE FIXING DEVICE, ASSEMBLY COMPRISING AT LEAST ONE SUCH FIXING DEVICE AND METHOD OF DISMANTLING SUCH A FIXING DEVICE

(71) Applicants: Airbus Operations SAS, Toulouse (FR); ATELIERS DE LA HAUTE GARONNE ETS AURIOL ET CIE SAS, Flourens (FR)

(72) Inventors: Jean-Noël Laurent, Rochefort (FR); Julien Bigot, Toulouse (FR); Adrien Fouladoux, Saint-Herblain (FR); Perig Le Henaff, Rochefort (FR); Arnaud Maurice, Rochefort (FR); Bertrand Jehenne, Flourens (FR); Lucas Gutierrez, Flourens (FR); François Meric, Flourens (FR)

(73) Assignees: Airbus Operations SAS, Toulouse (FR); ATELIERS DE LA HAUTE GARONNE ETS AURIOL ET CIE SAS, Flourens (FR)

( * ) Notice: Subject to any disclaimer, the term of this patent is extended or adjusted under 35 U.S.C. 154(b) by 0 days.

(21) Appl. No.: 18/916,784

(22) Filed: Oct. 16, 2024

(65) Prior Publication Data
US 2025/0129812 A1 Apr. 24, 2025

(30) Foreign Application Priority Data

Oct. 18, 2023 (FR) .................................. FR2311261

(51) Int. Cl.
*F16B 19/10* (2006.01)
(52) U.S. Cl.
CPC ............................... *F16B 19/1072* (2013.01)

(58) Field of Classification Search
CPC ....... F16B 19/1072; B25B 25/00; B23P 19/00
See application file for complete search history.

(56) References Cited

U.S. PATENT DOCUMENTS

| 3,443,474 A | * | 5/1969 | Emric | ................. F16B 19/1063 411/41 |
| 5,213,460 A | * | 5/1993 | Sadri | ................... F16B 19/1063 411/361 |

(Continued)

FOREIGN PATENT DOCUMENTS

| EP | 2647851 B1 | 6/2017 |
| WO | 2012142033 A2 | 10/2012 |
| WO | 2018224793 A1 | 12/2018 |

OTHER PUBLICATIONS

Tight-Screw 2004 www.tightscrew.com, 2004.*
French Search Report for corresponding French Patent Application No. 2311261 dated May 17, 2024.

*Primary Examiner* — Lawrence Averick
(74) *Attorney, Agent, or Firm* — Greer, Burns, & Crain, Ltd.

(57) ABSTRACT

A fastening device for keeping at least first and second parts assembled, the fastening device comprising a tubular body passing through the first and second parts, an expansion nut and a screw that is seated in the tubular body and cooperates with the expansion nut. To facilitate the removal of the fastening device, the screw has at least one shape, such as a recess positioned on the transverse face thereof, to prevent it from rotating using a first tool, and the expansion nut has at least one shape, such as a flat, to unscrew it using a second tool. Also an assembly comprising at least one such assembly device as well as a removal method.

13 Claims, 4 Drawing Sheets

(56) References Cited

U.S. PATENT DOCUMENTS

| | | | |
|---|---|---|---|
| 2009/0092462 A1* | 4/2009 | Pratt | ............... F16B 35/06 |
| | | | 411/383 |
| 2012/0263556 A1 | 10/2012 | Pratt | |
| 2014/0047699 A1 | 2/2014 | Pratt | |
| 2020/0139425 A1* | 5/2020 | Auriol | ............... B21J 15/28 |

* cited by examiner

BLIND TYPE REMOVABLE FIXING DEVICE, ASSEMBLY COMPRISING AT LEAST ONE SUCH FIXING DEVICE AND METHOD OF DISMANTLING SUCH A FIXING DEVICE

CROSS-REFERENCES TO RELATED APPLICATIONS

This application claims the benefit of French Patent Application Number 2311261 filed on Oct. 18, 2023, the entire disclosure of which is incorporated herein by way of reference.

FIELD OF THE INVENTION

The present application relates to a blind removable fastening device, to an assembly including at least one such fastening device, and to a method for removing one such fastening device.

BACKGROUND OF THE INVENTION

According to one embodiment shown in FIGS. 1 to 3 and described in document EP2647851, a blind fastening device 10, designed to keep first and second parts 12, 14 assembled, comprises a tubular body 16, an expansion nut 18, and a screw 20. Each of the first and second assembled parts 12, 14 comprises a through-hole 12.1, 14.1, to receive the tubular body 16, and a bearing surface 12.2, 14.2, the bearing surface 12.2 of the first part 12 comprising a chamfer 12.3 about the through-hole 12.1.

The tubular body 16 comprises a main portion 22 which extends between first and second ends 22.1, 22.2, a detachable portion 24 which comprises a lateral face 24.1 of hexagonal cross-section and a breakable joining zone 26 connecting the main portion 22 and the detachable portion 24. The tubular body 16 comprises a through-orifice 28 over the entire length thereof which has a tapered reduction in diameter 28.1 at the second end 22.2 of the main portion 22. The first end 22.1 of the main portion 22 has a tapered shape flared toward the second end 22.2. The tubular body 16 comprises, at the second end 22.2 of the main portion 22, a tapered head 30 designed to be seated in the chamfer 12.3 of the first part 12 when in operation.

The expansion nut 18 extends between first and second ends 18.1, 18.2, the second end 18.2 cooperating with the first end 22.1 of the main portion 22 of the tubular body 16 when in operation. The expansion nut 18 comprises an initially smooth lateral face 32 and a through-hole 34 which connects the first and second ends 18.1, 18.2. The expansion nut 18 can deform and expand so as to form a bulb 36 (visible in FIGS. 2 and 3) bearing against the bearing surface 14.2 of the second part 14 when the expansion nut 18 is subjected to a compressive force between the first and second ends 18.1, 18.2 thereof.

The through-hole 34 has a threaded section 34.2 close to the first end 18.1 of the expansion nut 18.

The screw 20 comprises a shank 38 which extends between first and second ends 38.1, 38.2, a head 40 of hexagonal cross-section for tightening the screw 20 and a breakable joining zone 42 connecting the shank 38 and the head 40. The shank 38 comprises a threaded section 44, which extends from the first end 38.1, designed to cooperate with the threaded section 34.2 of the expansion nut 18 and to be tightened therein. The second end 38.2 of the shank 38 has a tapered shape designed to cooperate with the reduction in diameter 28.1 of the tubular body 16.

The method for assembling such a fastening device comprises a step of inserting the device into the through-holes 12.1, 14.1 of the first and second parts 12, 14 to be assembled from the bearing surface 12.2 until the tapered head 30 of the tubular body 16 is seated in the chamfer 12.3 of the first part 12. The first end 22.1 of the main portion 22 projects from the bearing surface 14.2 of the second part 14.

The screw 20 is then tightened, the tubular body 16 being prevented from rotating by a tool which cooperates with the detachable portion 24 of the tubular body 16. The tapered shape of the second end 38.2 of the shank 38 of the screw 20 being in abutment against the reduction in diameter 28.1 of the tubular body 16, the expansion nut 18 is compressed between the first and second ends 18.1, 18.2 thereof, the second end 18.2 thereof being in contact with the first end 22.1 of the main portion 22 of the tubular body 16. The tightening then causes the expansion of the expansion nut 18 which then forms a bulb 36. When the latter is formed, the tightening causes the bulb 36 to be pressed against the bearing surface 14.2 of the second part 14. Consequently, the first and second parts 12 and 14 are compressed between the bulb 36 and the tapered head 30 of the tubular body 16. Once the desired tightening torque is reached, firstly the joining zone 42 breaks, and secondly, under the effect of a complementary movement of the assembly tool, the breakable joining zone 26 breaks. The fastening device 10 is then correctly tightened. As illustrated in FIG. 3, the tubular body 16 and the screw 20 are flush with the bearing surface 12.2 of the first part 12.

This embodiment makes it possible to automate assembly with a single tool designed to prevent the tubular body 16 from rotating and to tighten the screw.

To remove such a fastening device, one solution involves using a drill to destroy the tapered shape of the second end 38.2 of the shank 38. This solution is not satisfactory because the risk of damaging the bearing surface 12.2 of the first part 12 are high because the tubular body 16 and the screw 20 are flush with said bearing surface 12.2 of the first part 12. Another drawback is that machining the screw 20 generates debris that contaminates the environment if not collected. Finally, even if the tapered shape of the second end 38.2 of the shank 38 is destroyed, the expansion nut 18 may remain connected to the tubular body 16 because the second end 18.2 of the expansion nut may still be overlapping the first end 22.1 of the main portion 22 of the tubular body 16.

SUMMARY OF THE INVENTION

The present invention is intended to overcome some or all of the drawbacks in the prior art.

For this purpose, the invention relates to a fastening device for keeping at least first and second parts assembled, each of which has a through-hole and a bearing surface into which the through-hole opens, said fastening device comprising a tubular body, an expansion nut and a screw. The tubular body is designed to be seated in the through-holes of the first and second parts and extends between first and second ends, the first end of the tubular body cooperating with the expansion nut, the second end of the tubular body having a head designed to bear against the bearing surface of the first part. The expansion nut extends between first and second ends and has at least one threaded section and an axis of revolution, the expansion nut being designed to expand to form a bulb when subjected to a compressive force between the first and second ends thereof. The screw has a shank that extends between first and second ends and has an axis of revolution and an end face at the first end thereof, the shank comprising a threaded section which cooperates with the threaded section of the expansion nut, the second end of the shank having an enlarged shape bearing against the tubular body.

According to the invention, the screw has at least one shape positioned on the transverse face of the shank and designed to cooperate with a first tool to prevent the screw from rotating about the axis of revolution thereof with respect to the first tool. Additionally, the expansion nut has at least one shape designed to cooperate with a second tool to prevent the expansion nut from rotating about the axis of revolution thereof with respect to the second tool.

This solution generates no debris during removal, reduces the risk of damage to the first and second parts, and allows the tubular body and the expansion nut to be safely separated. This fastening device allows removal of the assembled parts without risk of damage, obviating the need to re-machine the bores of the assembled parts.

According to another feature, the expansion nut comprises a lateral face connecting the first and second ends of the expansion nut, as well as at least one flat positioned on the lateral face.

According to another feature, the lateral face comprises several flats regularly distributed about the axis of revolution of the expansion nut.

According to another feature, each flat is positioned close to the first end of the expansion nut.

According to another feature, the shank comprises a recess, coaxial with the axis of revolution of the screw, which opens into the transverse face and has a bottom and a lateral face connecting the bottom and the transverse face, the lateral face having at least one flat.

According to another feature, the recess comprises several flats regularly distributed about the axis of revolution of the screw.

According to another feature, the head is designed to allow it to be prevented from rotating or to be driven in rotation using a tool.

According to another feature, the head of the tubular body extends between first and second transverse faces, the second transverse face being designed to bear against the bearing surface of the first part. Additionally, the head comprises a first section of prismatic cross-section which extends from the first transverse face and a second section which extends between the first section and the second transverse face, which is larger in cross-section than the first section.

The invention also relates to an assembly comprising at least first and second parts and at least one fastening device according to one of the features set out above for keeping the first and second parts assembled.

The invention also relates to a method for removing a fastening device according to one of the features set out above. This removal method comprises a step of unscrewing a first element, which is either the screw or the expansion nut, with respect to a second element, which is different from the first element and is either the screw or the expansion nut, by preventing the second element from rotating using a first tool and pivoting the first element using a second tool.

According to another feature, the method comprises a step of unscrewing the expansion nut with respect to the screw by preventing the screw from rotating using the first tool, which cooperates with the recess in the screw, and pivoting the expansion nut using the second tool, which cooperates with the flats of the expansion nut.

According to another feature, before the step of unscrewing the expansion nut with respect to the screw or at the beginning of this unscrewing step, the removal method comprises a step of unlocking the expansion nut with respect to the tubular body by preventing the tubular body from rotating using a third tool, which cooperates with the head of the tubular body, and pivoting the expansion nut using the second tool.

BRIEF DESCRIPTION OF THE DRAWINGS

Other features and advantages will become apparent from the following description of the invention, the description being given solely by way of example and with reference to the appended drawings, in which.

DETAILED DESCRIPTION OF THE PREFERRED EMBODIMENTS

Figure 7:
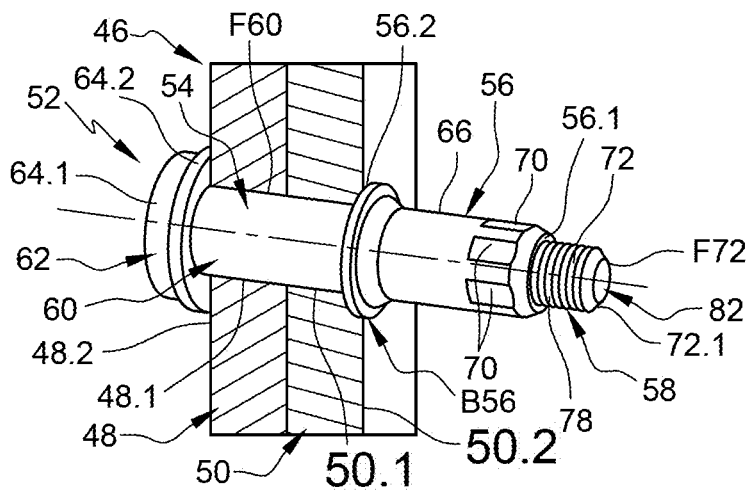
FIG. 7 is a cross-section of an assembly including a fastening device, illustrating one embodiment of the invention.

According to an embodiment visible in FIG. 7, an assembly 46 comprises at least first and second parts 48, 50 as well as at least one fastening device 52 keeping the first and second parts 48, 50 assembled. The first and second assembled parts 48, 50 each comprise a through-hole 48.1, 50.1 as well as a bearing surface 48.2, 50.2 into which the through-hole 48.1, 50.1 opens. The bearing surface 48.2 of the first part 48 may comprise a chamfer about the through-hole 48.1.

The fastening device 52 comprises a tubular body 54 passing through the first and second parts 48, 50, an expansion nut 56, and a screw 58 seated in the tubular body and cooperating with the expansion nut 56.

Figure 4:
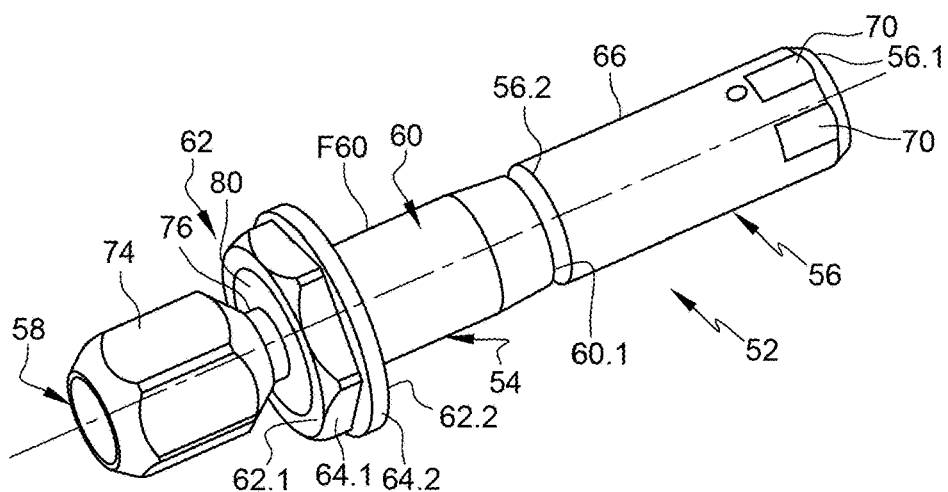
FIG. 4 is a perspective view from a first viewing angle of a fastening device, illustrating one embodiment of the invention.
Figure 5:
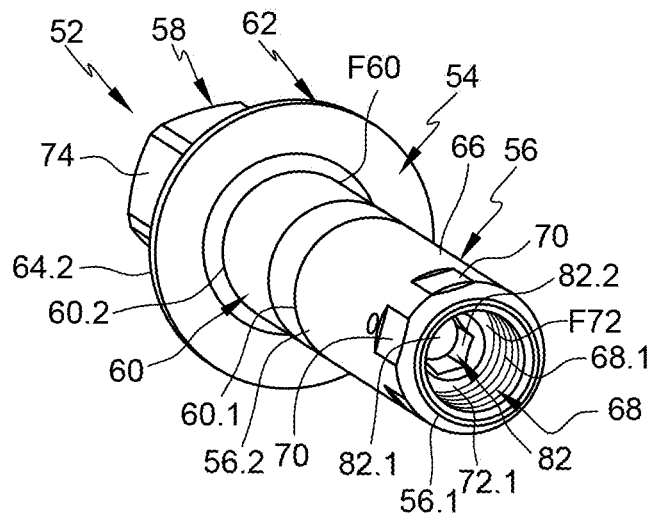
FIG. 5 is a perspective view from a second viewing angle of the fastening device shown in FIG. 4.
Figure 6:
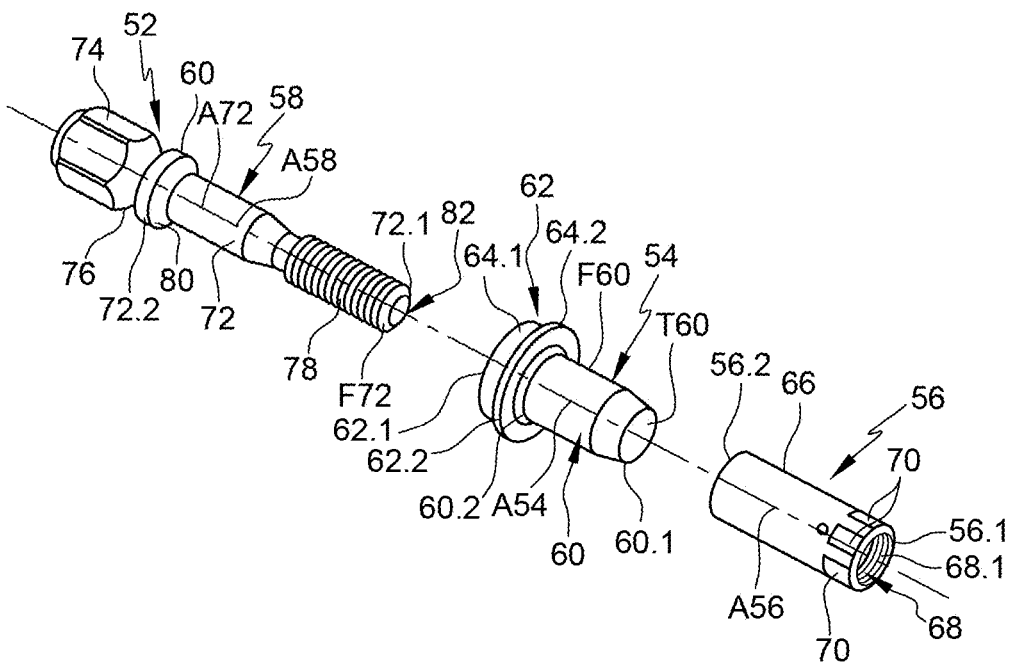
FIG. 6 is a perspective view of the fastening device visible in FIG. 4, in the disassembled state.

According to an embodiment visible in FIGS. 4 to 6, the tubular body 54 comprises a tubular portion 60 which extends between first and second ends 60.1, 60.2, a head 62 which extends between first and second transverse faces 62.1, 62.2 (the second end 60.2 of the tubular portion 60 being connected to the second transverse face 62.2) as well as a through-orifice T60 which opens into the first end 60.1 of the tubular portion 60 and into the first transverse face 62.1 of the head 62.

According to one arrangement, the tubular portion 60 has a cylindrical lateral face F60 which has a diameter substantially equal to or slightly smaller than the diameters of the through-holes 48.1, 50.1 of the first and second parts 48, 50. The through-orifice T60 is smooth.

The first end 60.1 of the tubular portion 60 has a tapered shape which flares toward the second end 60.2.

The through-orifice T60 comprises an enlargement, such as a chamfer or a counterbore, at the end thereof that opens into the first transverse face 62.1 of the head 62.

According to one embodiment, the head 62 comprises a first section 64.1 of prismatic cross-section, notably hexagonal, which extends from the first transverse face 62.1 and a second section 64.2 which extends between the first section 64.1 and the second transverse face 62.2, which is of circular cross-section and larger in cross-section than the first section 64.1. This second section 64.2 forms a false washer. The latter distributes the forces on the first or second part 48, 50 better and holds the fastening device in an assembly tool better. Of course, the invention is not limited to this geometry (hexagonal) of the head 62. Whatever the embodiment, the head 62 is designed to allow it to be prevented from rotating or to be driven in rotation using a tool.

When in operation, the second transverse face 62.2 of the head 62 is designed to be pressed against the bearing surface 48.2 of the first part 48. The first section 64.1 is used to prevent the tubular body 54 from rotating using a tool.

Of course, the invention is not limited to this embodiment of the tubular body 54. The latter could be identical to those in the prior art. Whatever the embodiment, the tubular body 54 is designed to be seated in the through-holes 48.1, 50.1 of the first and second parts 48, 50. It comprises a tubular portion 60 which extends between first and second ends 60.1, 60.2 and has an axis of revolution A54, the first end 60.1 cooperating with the expansion nut 56 and having a flared shape toward the second end 60.2, the second end 60.2 having a head 62 designed to bear against the bearing surface 48.2 of the first part 48.

The expansion nut 56 extends between first and second ends 56.1, 56.2, the second end 56.2 being in contact with the first end 60.1 of the tubular portion 60 of the tubular body 54 when in operation. The expansion nut 56 comprises a lateral face 66 and a through-hole 68 which connects the first and second ends 56.1, 56.2. The expansion nut 56 is designed to deform and expand to form a bulb B56 (visible in FIG. 7) when the expansion nut 56 is subjected to a compressive force between the first and second ends 56.1, 56.2 thereof. When in operation, the bulb B56 bears against the bearing surface 50.2 of the second part 50.

Before deformation, the lateral face 66 has a diameter substantially equal to the diameter of the lateral face F60 of the tubular body 54.

The through-hole 68 has a threaded section 68.1 that extends from the first end 56.1 of the expansion nut 56.

With the exception of the lateral face 66 thereof, the expansion nut 56 may be identical to those in the prior art. Whatever the embodiment, the expansion nut 56 extends between first and second ends 56.1, 56.2 and comprises a through-hole 68 which opens into the first and second ends 56.1, 56.2. This through-hole 68 has at least one threaded section 68.1 and an axis of revolution A56. The second end 56.2 of the expansion nut 56 cooperates with the first end 60.1 of the tubular portion 60 of the tubular body 54 when in operation. The expansion nut 56 is designed to deform and expand to form a bulb B56 when subjected to a compressive force between the first and second ends 56.1, 56.2 thereof.

According to one detail of the invention, the expansion nut 56 has at least one shape designed to cooperate with a tool to prevent the expansion nut 56 from rotating about the axis of revolution A56 thereof with respect to the tool. According to one embodiment, the lateral face 66 of the expansion nut 56 comprises at least one flat 70. According to one arrangement, the lateral face 66 comprises several flats 70 regularly distributed about the axis of revolution A56 of the expansion nut 56. By way of example, the lateral face 66 comprises six flats. Of course, the invention is not limited to this geometry for the expansion nut 56. Whatever the embodiment, the expansion nut 56 is designed to cooperate with a tool to prevent it from rotating about its axis of revolution A56 with respect to the tool.

According to one arrangement, each flat 70 is positioned close to the first end 56.1 of the expansion nut 56. The flats all have the same length (dimension measured in a direction parallel to the axis of revolution A56 of the expansion nut 56) and are positioned between two transverse planes.

The screw 58 comprises a shank 72 which extends between first and second ends 72.1, 72.2, a head 74 of hexagonal cross-section for tightening the screw 58, and a breakable joining zone 76 connecting the shank 72 and the head 74. The shank 72 comprises a threaded section 78, which extends from the first end 72.1, designed to cooperate with the threaded section 68.1 of the expansion nut 56 and to be tightened therein. The second end 72.2 of the shank 72 has an enlarged shape 80 designed to bear against the tubular body 54.

With the exception of the first end 72.1 of the shank 72 thereof, the screw 58 could be identical to the screws in the prior art. Whatever the embodiment, the shank 72 of the screw 58 extends between first and second ends 72.1, 72.2 and has an axis of revolution A72 and an end face F72 at the first end 72.1 thereof, substantially perpendicular to the axis of revolution A72. The shank 72 comprises a threaded section 78, which extends from the first end 72.1, designed to cooperate with the threaded section 68.1 of the expansion nut 56 and to be tightened therein, the second end 72.2 of the shank 72 having an enlarged shape 80 designed to bear against the tubular body 54.

According to a detail of the invention, the screw 58 has at least one shape positioned on the end face F72 and designed to cooperate with a tool to prevent the screw 58 from rotating about the axis of revolution A58 thereof with respect to the tool. According to one embodiment, the shank 72 comprises a recess 82, coaxial with the axis of revolution A58 of the screw 58, which opens into the end face F72 and has a bottom 82.1 and a lateral face 82.2 connecting the bottom 82.1 and the end face F72, the lateral face 82.2 having at least one flat. According to one arrangement, the recess 82 comprises several flats regularly distributed about the axis of revolution A58 of the screw 58. According to one arrangement, the recess 82 comprises six flats and has a hexagonal cross-section. Each flat extends between the end face F72 and the bottom 82.1. Of course, the invention is not limited to this geometry for the recess 82. Whatever the embodiment, the screw 58 is designed to cooperate with a tool to prevent it from rotating about its axis of revolution A58 with respect to the tool.

Figure 1:
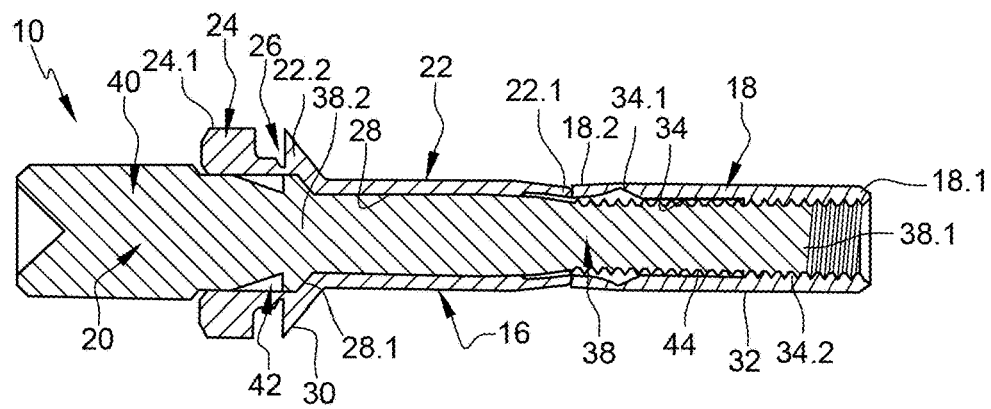
FIG. 1 is a longitudinal cross-section of a fastening device, illustrating an embodiment of the prior art.
Figure 2:
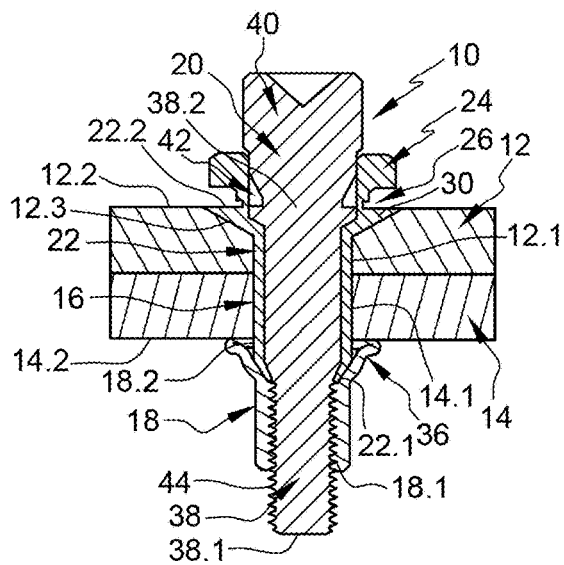
FIG. 2 is a cross-section of an assembly including a fastening device during assembly, illustrating an embodiment of the prior art.
Figure 3:
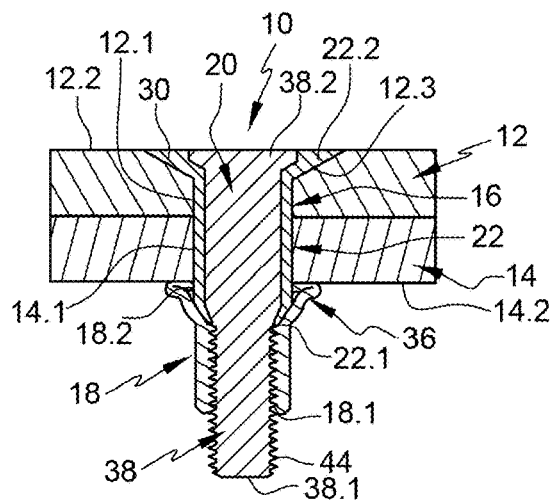
FIG. 3 is a cross-section of an assembly including a fastening device following assembly, illustrating an embodiment of the prior art.

According to one operating mode, the fastening device 52 is mounted using substantially the same assembly method as for the fastening devices in the prior art visible in FIGS. 1 to 3.

Thus, an assembly method comprises a step of inserting the device into the through-holes 48.1, 50.1 of the first and second parts 48, 50 to be assembled from the bearing surface 48.2 of the first part 48 until the head 62 of the tubular body 54 bears against the bearing surface 48.2 of the first part 48. The first end 60.1 of the tubular body 54 projects from the bearing surface 50.2 of the second part 50.

The screw 58 is then tightened using a first tool, the tubular body 54 being prevented from rotating by a second tool which cooperates with the head 62 of the tubular body 54. The second section 64.2 of the head 62, which forms a false washer, limits the risk of damaging the first part 48 with the second tool.

When the screw 58 is tightened, the expansion nut 56 is compressed between the first and second ends 56.1, 56.2 thereof, the second end 56.2 thereof being in contact with the first end 60.1 of the tubular portion 60 of the tubular body 54. This tightening thus causes the expansion of the expansion nut 56 which then forms a bulb B56. When the latter is formed, the tightening causes the bulb B56 to be pressed against the bearing surface 50.2 of the second part 50. Consequently, the first and second parts 48 and 50 are compressed between the bulb B56 of the expansion nut 56 and the head 62 of the tubular body 54. Once a desired tightening torque is reached, the breakable joining zone 76 of the screw 58 breaks. The fastening device 52 is then correctly tightened.

A method for removing the fastening device 52 is described with reference to FIGS. 8 to 10. This removal method comprises a step of unscrewing a first element, which is either the screw 58 or the expansion nut 56, with respect to a second element, which is different from the first element and is either the screw 58 or the expansion nut 56, by preventing the second element from rotating using a first tool and pivoting the first element using a second tool. According to one operating mode, the tubular body 54 can be immobilized before the unscrewing step in order to unlock the expansion nut 56.

Figure 8:
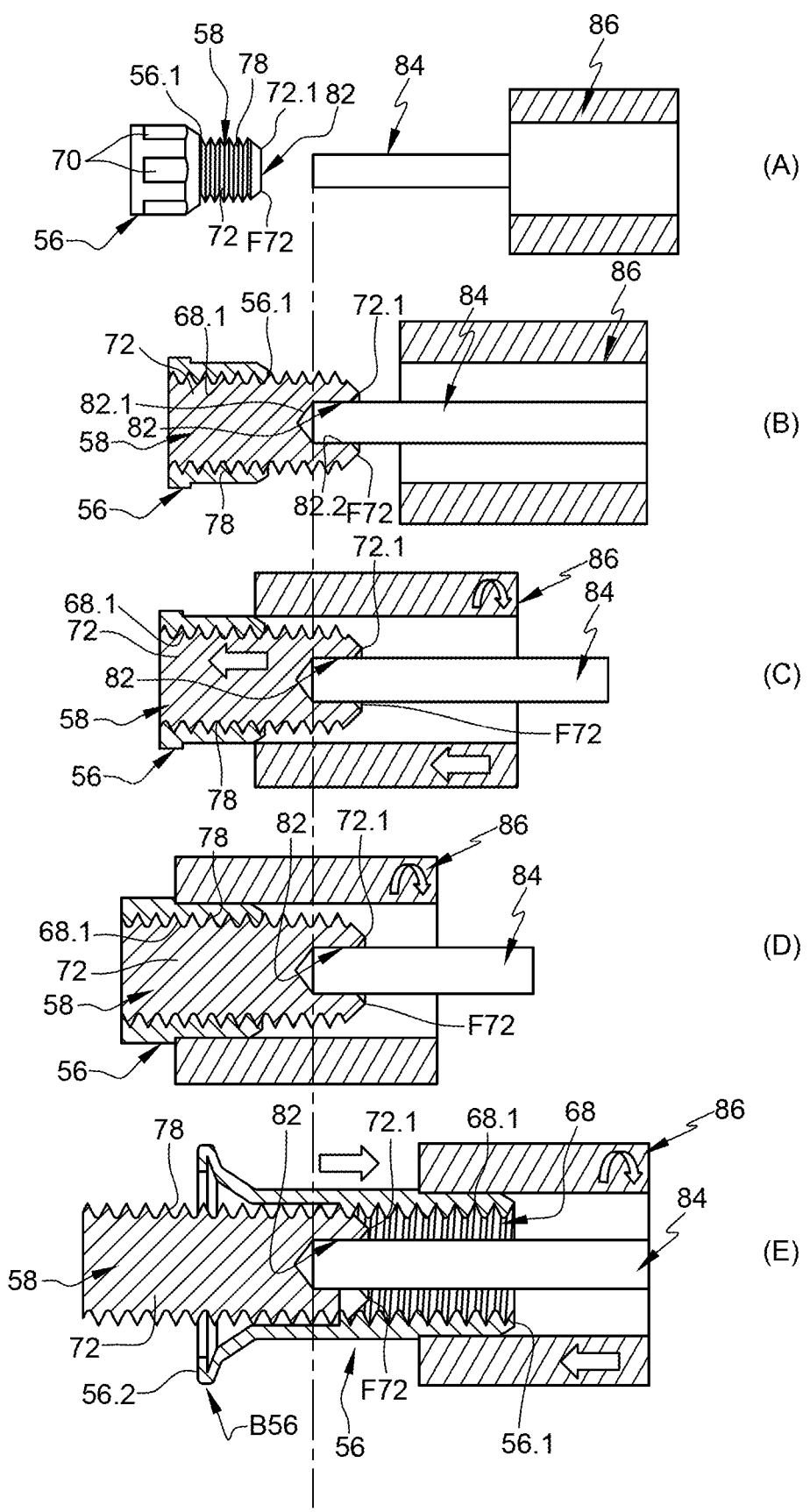
FIG. 8 shows cross-sections illustrating different steps of a method for removing the fastening device visible in FIG. 4.
Figure 9:
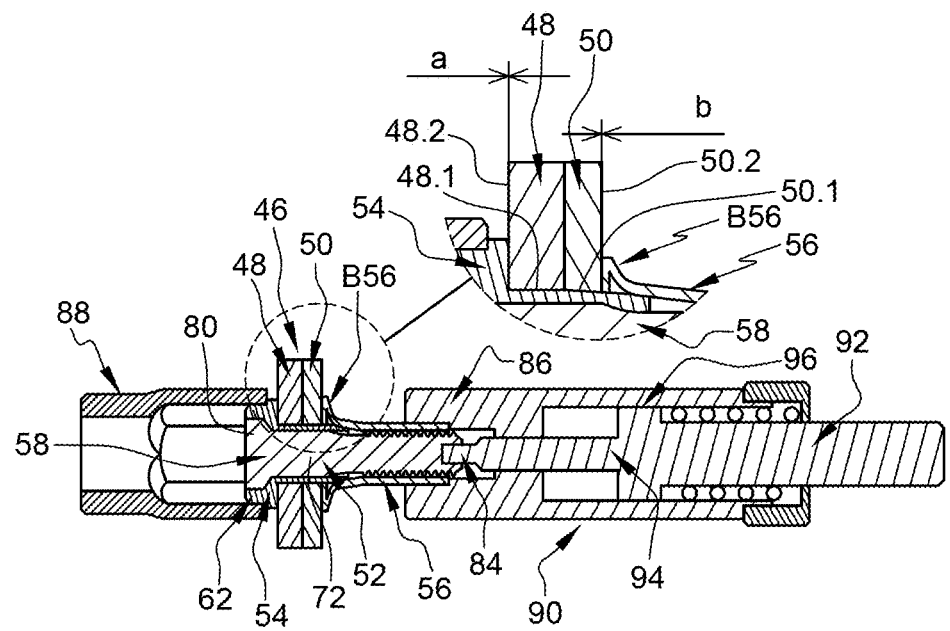
FIG. 9 is a longitudinal cross-section of a fastening device and of a removal tool, illustrating a step in a removal method.
Figure 10:
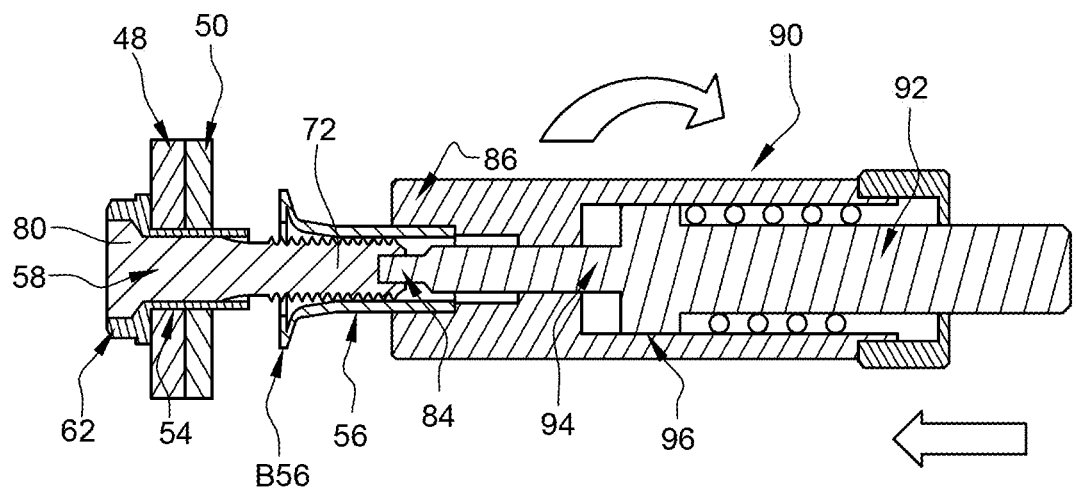
FIG. 10 is a longitudinal cross-section of the fastening device and of the removal tool visible in FIG. 9, illustrating another step of the removal method.

According to a preferred embodiment visible in FIGS. 8 to 10, the removal method comprises a step of unscrewing the expansion nut 56 with respect to the screw 58 by preventing the screw 58 from rotating using the first tool 84, which cooperates with the recess 82 in the screw 58, and pivoting the expansion nut 56 using the second tool 86, which cooperates with the flats 70 of the lateral face 66 of the expansion nut 56. By way of example, the first tool 84 is a hexagonal male wrench and the second tool 86 is a socket wrench.

According to one embodiment, before the step of unscrewing the expansion nut 56 with respect to the screw 58 or at the beginning of this unscrewing step, the removal method comprises a step of unlocking the expansion nut 56 with respect to the tubular body 54 by preventing the tubular body 54 from rotating using a third tool 88, which cooperates with the first section 64.1 of the head 62 of the tubular body 54, and pivoting the expansion nut 56 using the second tool 86. For example, the third tool 88 is a socket wrench. This unlocking step is necessary if the recess 82 of the screw 58 is not sufficient to unlock the expansion nut 56 at the beginning of the unscrewing step because of the high pressure exerted by the expansion nut 56 on the tubular body 54.

As illustrated in FIG. 9, the third tool 88 is firstly fitted onto the head 62 of the tubular body 54. The first tool 84 is then inserted into the recess 82 in the screw 58, as illustrated in FIG. 9 and parts (A) and (B) of FIG. 8, and the second tool 86 is fitted onto the expansion nut 56 by making it cooperate with the flats 70, as illustrated in parts (C) and (D) of FIG. 8. With the third tool 88 preventing the tubular body 54 from rotating, the second tool 86 is then driven in rotation, as illustrated in FIG. 9. The expansion nut 56 is then unscrewed using the second tool 86, with the first tool 84 preventing the screw 58 from rotating, as illustrated in part (D) of FIG. 8 and FIG. 10.

At the end of the unscrewing step, the expansion nut 56 is separated from the screw 58. Consequently, the tubular body 54 and the screw 58 can be withdrawn from the through-holes 48.1, 50.1 of the first and second parts 48, 50.

This operating mode generates no debris and enables the tubular body 54 and the expansion nut 56 to be safely separated.

According to an embodiment visible in FIGS. 9 and 10, a single tool 90 supports the first and second tools 84, 86, the tool 90 comprising a support 92, a static link 94 connecting the support 92 and the first tool 84, as well as a pivoting link 96 which connects the support 92 and the second tool 86.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fastening device for keeping at least first and second parts assembled, each of which has a through-hole and a bearing surface into which the through-hole opens, said fastening device comprising:
   a tubular body;
   an expansion nut;
   and a screw,
   the tubular body extending between a first end and a second end and configured to be seated in the through-holes of the first and second parts, the first end of the tubular body cooperating with the expansion nut, the second end of the tubular body having a head configured to bear against the bearing surface of the first part,
   the expansion nut extending between a first end and a second end, having at least one threaded section and an axis of revolution, the expansion nut configured to expand to form a bulb when subjected to a compressive force between the first and second ends thereof,
   the screw having a shank extending between a first end and a second end, an axis of revolution, and an end face at the first end of the shank, the shank comprising a threaded section which cooperates with the threaded section of the expansion nut, the second end of the shank having an enlarged shape bearing against the tubular body,
   wherein the screw has at least one shape, on a transverse face of the shank, configured to cooperate with a first tool to prevent the screw from rotating about the axis of revolution thereof with respect to the first tool,
   wherein the expansion nut has at least one shape designed to cooperate with a second tool to prevent the expansion nut from rotating about the axis of revolution thereof with respect to the second tool, wherein the expansion nut further comprises a lateral face connecting the first and second ends of the expansion nut, and at least one flat positioned on the lateral face, and wherein the lateral face comprises a plurality of flats regularly distributed about the axis of revolution of the expansion nut.

2. The fastening device as claimed in claim 1, wherein each flat is positioned closer to the first end of the expansion nut than to the second end of the expansion nut.

3. The fastening device as claimed in claim 1, wherein the shank further comprises a recess, coaxial with the axis of revolution of the screw, which opens into the transverse face and has a bottom and a lateral face connecting the bottom and the transverse face, the lateral face having at least one flat.

4. The fastening device as claimed in claim 3, wherein the recess comprises a plurality of flats regularly distributed about the axis of revolution of the screw.

5. The fastening device as claimed in claim 1, wherein the head is configured to allow the head to be prevented from rotating or to be driven in rotation using a tool.

6. The fastening device as claimed in claim 5, wherein the head of the tubular body extends between a first transverse face and a second transverse face, the second transverse face configured to bear against the bearing surface of the first part, and wherein the head comprises a first section of prismatic cross-section which extends from the first transverse face and a second section which extends between the first section and the second transverse face, the second section larger in cross-section than the first section.

7. An assembly comprising:
a first part,
a second part, and
at least one fastening device as claimed in claim 1 configured to keep the first and second parts assembled.

8. A fastening device for keeping at least first and second parts assembled, each of which has a through-hole and a bearing surface into which the through-hole opens, said fastening device comprising:
a tubular body;
an expansion nut;
and a screw,
the tubular body extending between a first end and a second end and configured to be seated in the through-holes of the first and second parts, the first end of the tubular body cooperating with the expansion nut, the second end of the tubular body having a head configured to bear against the bearing surface of the first part,
the expansion nut extending between a first end and a second end, having at least one threaded section and an axis of revolution, the expansion nut configured to expand to form a bulb when subjected to a compressive force between the first and second ends thereof,
the screw having a shank extending between a first end and a second end, an axis of revolution, and an end face at the first end of the shank, the shank comprising a threaded section which cooperates with the threaded section of the expansion nut, the second end of the shank having an enlarged shape bearing against the tubular body, wherein the screw has at least one shape, on a transverse face of the shank, configured to cooperate with a first tool to prevent the screw from rotating about the axis of revolution thereof with respect to the first tool, wherein the expansion nut has at least one shape designed to cooperate with a second tool to prevent the expansion nut from rotating about the axis of revolution thereof with respect to the second tool, wherein the expansion nut further comprises a lateral face connecting the first and second ends of the expansion nut, and at least one flat positioned on the lateral face, and wherein each flat is positioned closer to the first end of the expansion nut than to the second end of the expansion nut.

9. The fastening device as claimed in claim 8, wherein the shank further comprises a recess, coaxial with the axis of revolution of the screw, which opens into the transverse face and has a bottom and a lateral face connecting the bottom and the transverse face, the lateral face having at least one flat.

10. The fastening device as claimed in claim 9, wherein the recess comprises a plurality of flats regularly distributed about the axis of revolution of the screw.

11. The fastening device as claimed in claim 8, wherein the head is configured to allow the head to be prevented from rotating or to be driven in rotation using a tool.

12. The fastening device as claimed in claim 11, wherein the head of the tubular body extends between a first transverse face and a second transverse face, the second transverse face configured to bear against the bearing surface of the first part, and wherein the head comprises a first section of prismatic cross-section which extends from the first transverse face and a second section which extends between the first section and the second transverse face, the second section larger in cross-section than the first section.

13. An assembly comprising:
a first part,
a second part, and
at least one fastening device as claimed in claim 8 configured to keep the first and second parts assembled.

\* \* \* \* \*